(12) United States Patent
Kim et al.

(10) Patent No.: US 7,587,225 B2
(45) Date of Patent: Sep. 8, 2009

(54) SLIDING-FOLDING TYPE PORTABLE COMMUNICATION APPARATUS

(75) Inventors: Joon-Suh Kim, Anyang-si (KR); Chang-Son Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 353 days.

(21) Appl. No.: 11/227,740

(22) Filed: Sep. 15, 2005

(65) Prior Publication Data

US 2006/0105824 A1 May 18, 2006

(30) Foreign Application Priority Data

Nov. 15, 2004 (KR) ...................... 10-2004-0092959

(51) Int. Cl.
*H04M 1/00* (2006.01)
(52) U.S. Cl. ............... 455/575.1; 455/575.3; 455/575.4
(58) Field of Classification Search ............. 455/575.1, 455/575.3, 575.4, 575.8
See application file for complete search history.

(56) References Cited

U.S. PATENT DOCUMENTS

| | | | |
|---|---|---|---|
| 6,850,773 B1 * | 2/2005 | Ghassabian | 455/550.1 |
| 7,197,346 B2 * | 3/2007 | Eromaki et al. | 455/575.8 |
| 7,251,323 B2 * | 7/2007 | Holtorf et al. | 379/433.13 |
| 7,269,450 B2 * | 9/2007 | Lee et al. | 455/575.1 |
| 7,492,891 B2 * | 2/2009 | Eldon | 379/433.12 |
| 2004/0166907 A1 * | 8/2004 | Yajima | 455/575.3 |
| 2004/0198437 A1 * | 10/2004 | Yamamoto et al. | 455/556.1 |
| 2004/0266496 A1 * | 12/2004 | Kauhaniemi et al. | 455/575.1 |
| 2005/0020323 A1 * | 1/2005 | Kim | 455/575.1 |
| 2005/0083642 A1 * | 4/2005 | Senpuku et al. | 361/681 |
| 2005/0107142 A1 * | 5/2005 | Soejima | 455/575.3 |
| 2006/0089182 A1 * | 4/2006 | Gartrell | 455/575.3 |
| 2006/0229118 A1 * | 10/2006 | Kaneko | 455/575.3 |
| 2007/0053504 A1 * | 3/2007 | Sato et al. | 379/156 |
| 2008/0139260 A1 * | 6/2008 | Kauhaniemi et al. | 455/575.4 |
| 2009/0093283 A1 * | 4/2009 | Mizuta et al. | 455/575.3 |

FOREIGN PATENT DOCUMENTS

| | | |
|---|---|---|
| JP | 2004120333 | 4/2004 |
| KR | 2004-0025624 | 3/2004 |

* cited by examiner

*Primary Examiner*—Nay A Maung
*Assistant Examiner*—Andrew Wendell
(74) *Attorney, Agent, or Firm*—The Farrell Law Firm, LLP (57) ABSTRACT

Disclosed is a sliding-folding type portable communication apparatus that provides advantages of both sliding type and folding type portable communication apparatuses. The sliding-folding type portable communication apparatus has a soft cover having a folding section, a hinge unit provided in the folding section, and a body coupled to the soft cover while facing one surface of the soft cover, the body sliding lengthwise along the soft cover and being opened/closed when the soft cover is extended/folded.

16 Claims, 10 Drawing Sheets

SLIDING-FOLDING TYPE PORTABLE COMMUNICATION APPARATUS

PRIORITY

This application claims priority to an application entitled "Sliding-Folding Type Portable Communication Apparatus" filed with the Korean Intellectual Property Office on Nov. 15, 2004 and assigned Serial No. 2004-92959, the contents of which are incorporated herein by reference.

BACKGROUND OF THE INVENTION

1. Field of the Invention

The present invention relates to a portable communication apparatus, such as a cellular phone, a PDA (Personal Digital Assistant), an HHP (HandHeld Phone), a camera phone, a game phone, or an Internet phone for sending messages, and more particularly to a sliding-folding type portable communication apparatus.

2. Description of the Related Art

In general, a "portable communication apparatus" refers to an electronic appliance that allows users to wirelessly communicate with other users via the portable communication apparatus. In consideration of portability, designs of such portable communication apparatuses tend to be compact, slim, and light, and also tend to provide multimedia capability along with a wide variety of other functions. In particular, future portable communication apparatuses are expected to incorporate greater multi-functionality and be capable of multi-purpose utilization, as well as to be more compact and light. The portable communication apparatuses will likely be modified to be suitable for various multimedia environments or Internet environments. Additionally, such portable communication apparatuses are now commonly used by all kinds of people, regardless of age or gender, throughout the world, and are recognized by some people as being a nearly indispensable commodity which must be carried at all times.

A conventional portable communication apparatus may be classified into one of various types according to its external appearance, e.g. a bar-type, a flip-type, or a folder-type. The bar-type portable communication apparatus has a single housing shaped like a bar. The flip-type portable communication apparatus has a flip pivotably mounted to a bar-shaped housing by a hinge unit. The folder-type portable communication apparatus has a folder coupled to a single bar-shaped housing by a hinge unit in such a manner that the folder can be rotated to fold to or unfold from the housing.

In addition, a portable communication apparatus can be classified into a neck wearable-type portable communication apparatus or a wrist-type portable communication apparatus according to its position with respect to a human body. The user can wear the neck wearable-type portable communication apparatus on his or her neck using a string or lanyard. In addition, the user can wear the wrist-type portable communication apparatus on his or her wrist.

Further, a portable communication apparatus may be classified as a rotation-type communication apparatus or sliding-type communication apparatus according to the manner of opening and closing the communication apparatus. In the rotation-type portable communication apparatus, two housings are coupled to each other in such a manner that one housing rotates to open and close relative to the other while they face each other. In the sliding-type portable communication apparatus, two housings are coupled to each other in such a manner that one housing slides to open or close relative to the other. These variously classified portable communication apparatuses can be easily understood by those skilled in the art.

Meanwhile, conventional portable communication apparatuses typically include a function for transmitting data at a high speed in addition to the basic function of performing voice communication. In other words, according to the increased consumer demand, portable communication apparatuses now tend to provide a service using a wireless communication technology capable of transmitting data at a high speed.

Currently, portable communication apparatuses tend to be equipped with camera lenses which enable each communication apparatus to capture and transmit an image signal. That is, current portable communication apparatuses may have an internal or an external camera lens module which enables a user to make image communication with a desired partner or to photograph a desired subject.

However, although the folder-type portable communication apparatus has an advantage in view of portability because it can be fabricated in a compact size, a display unit of the folder-type communication apparatus is so small that the user may feel inconvenienced when viewing an image displayed on the display unit. In addition, although the sliding-type portable communication apparatus is equipped with a display unit having a large size for allowing the user to conveniently view the image displayed on the display unit, it may represent a problem in regard to maintaining compactness. In addition, since the display unit is exposed to an exterior without a protective device therefor, the display unit of the sliding-type portable communication apparatus may be easily broken if the sliding-type portable communication apparatus falls to the ground through user's carelessness.

Furthermore, body frames of the conventional portable communication apparatuses are generally made from rigid plastic, so the body frames may be broken or internal parts installed in the body frames may be damaged when storing external impact is applied to the body frames.

Actually, the portable communication apparatus may frequently fall to the ground through user's carelessness, so the body frames of the portable communication apparatuses may be easily broken or edges of a display unit or an antenna housing may be easily damaged.

SUMMARY OF THE INVENTION

Accordingly, the present invention has been made to solve the above-mentioned problems occurring in the prior art, and an object of the present invention is to provide a sliding-folding type portable communication apparatus having a large-sized display unit adaptable for various multimedia environments.

Another object of the present invention is to provide a portable communication apparatus capable of protecting a display unit by use of a foldable soft cover.

Still another object of the present invention is to provide a portable communication apparatus including a soft cover folded in half and a body having a display unit and slidably moving along the soft cover.

Still another object of the present invention is to provide a portable communication apparatus allowing a user to conveniently play games using the portable communication apparatus by allowing a display unit to be transversely aligned between functional keys.

Still another object of the present invention is to provide a portable communication apparatus having a hinge unit in the form of a watch chain to allow the hinge unit to surround a body of the portable communication apparatus in a closed state of the portable communication apparatus.

Still another object of the present invention is to provide a portable communication apparatus adaptable for operation in various modes and capable of being fabricated in a compact size.

In order to accomplish these objects, there is provided a sliding-folding type portable communication apparatus including a soft cover having a folding section; a hinge unit provided in the folding section; and a body coupled to the soft cover while facing one surface of the soft cover, the body sliding lengthwise along the soft cover and being opened/closed when the soft cover is extended/folded.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted to avoid making the subject matter of the present invention unclear.

The present invention suggests a sliding-folding type portable communication apparatus which includes advantages of both a sliding type portable communication apparatus and a folding type portable communication apparatus. Therefore, the sliding-folding type portable communication apparatus according to the present invention includes a body slidably coupled to a soft cover and a hinge unit provided in a folding section of the soft cover.

Figure 1:
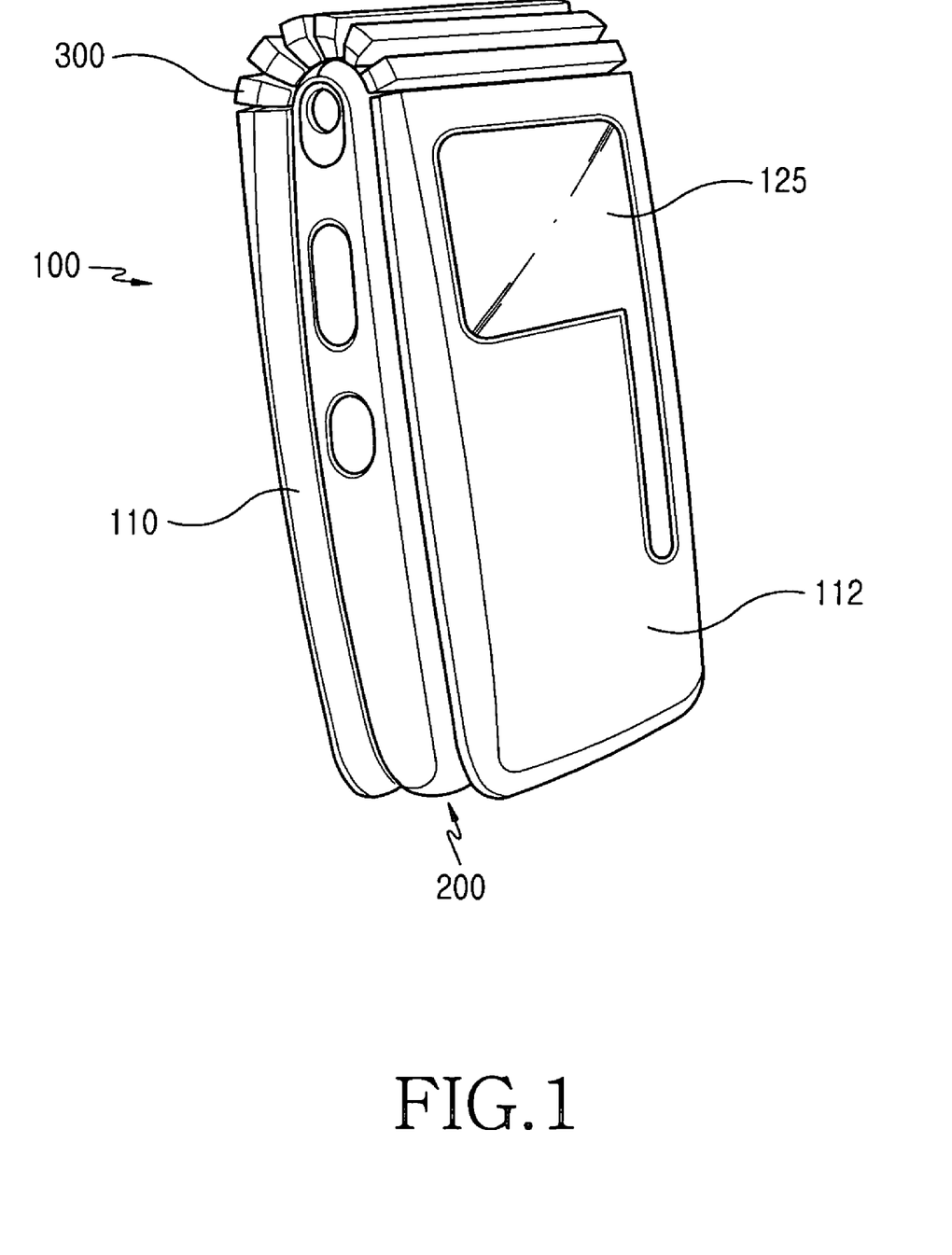
FIGS. 1 and 2 are perspective views of a closed state of a sliding-folding type portable communication apparatus according to one embodiment of the present invention.
Figure 2:
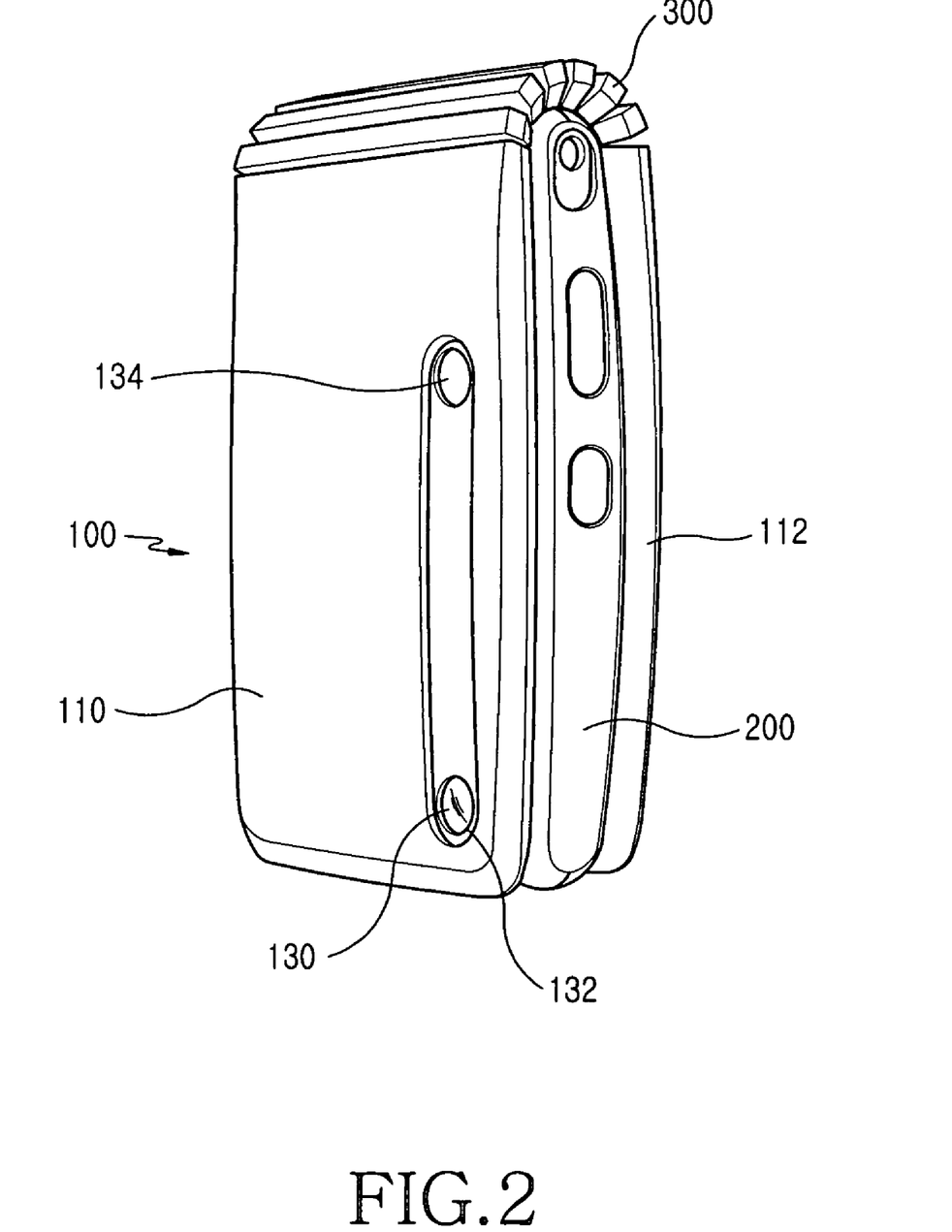
Figure 3:
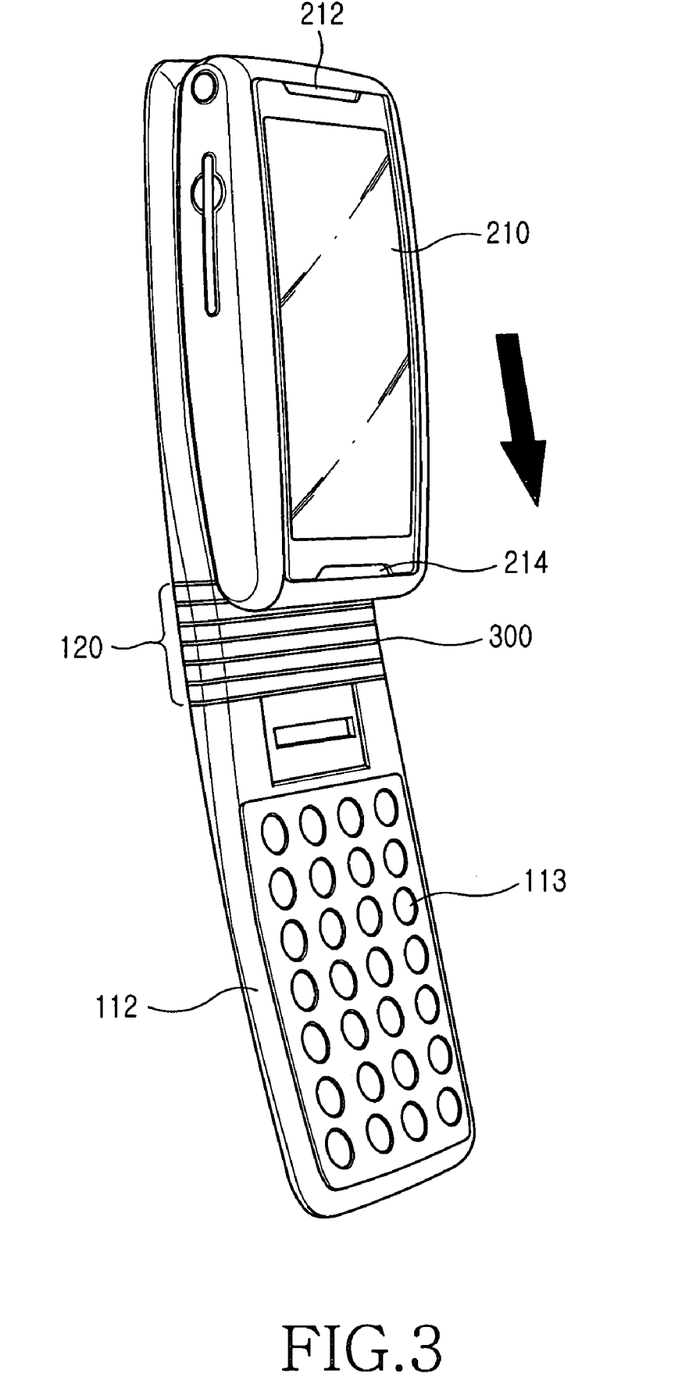
FIG. 3 is a perspective view illustrating a sliding-folding type portable communication apparatus, which has been completely opened, according to one embodiment of the present invention.
Figure 4:
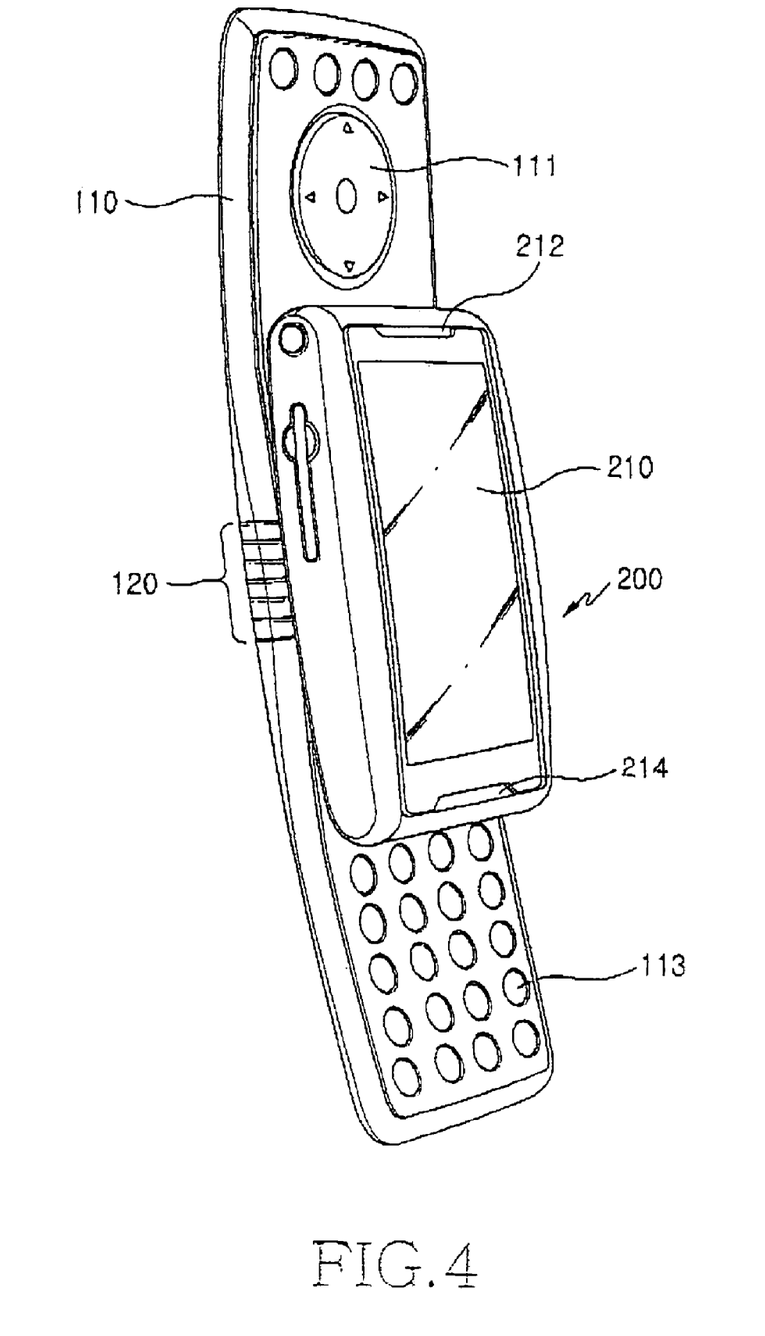
FIG. 4 is a perspective view illustrating a sliding movement of a body in a sliding-folding type portable communication apparatus according to one embodiment of the present invention.

As shown in FIGS. 1 to 4, the sliding-folding type portable communication apparatus according to the present invention includes a soft cover 100 having a folding section 120, a hinge unit 300 provided in the folding section 120 and a body 200 coupled to the soft cover 100 while facing one surface of the soft cover 100. The body 200 slides lengthwise along the soft cover 100 and is opened/closed when the soft cover 100 is extended/folded. The folding section 120 acts as a part of the hinge unit 300. FIGS. 1 and 2 show a closed state of the body 200 in which the soft cover 100 is completely folded, and FIGS. 3 and 4 show an opened state of the body 200 in which the soft cover 100 is completely extended. Preferably, when the body 200 is completely closed by means of the soft cover 100, one end of the body 200 is surrounded by the hinge unit 300, that is, the folding section 120.

As shown in FIGS. 3 and 4, the body 200 includes a display unit 210 provided at an upper surface thereof with a display screen. The body 200 has first and second speaker units 212 and 214. Preferably, the display unit 210 includes an LCD.

The soft cover 100 is an elongated plate, which can be folded or extended by means of the hinge unit 300. The soft cover 100 includes a first section 110 and a second section 112, which are opposite to each other about the folding section 120. Thus, the first and second sections 110 and 112 are aligned in the same plane when the soft cover 100 is completely extended, and face each other when the soft cover 100 is completely folded. A first key section 111 including a plurality of keys is provided on a surface of the first section 110 and a second key section 113 including a plurality of keys is provided on a surface of the second section 120. The first and second key sections 111 and 113 are opposite to each other about the hinge unit 300. The soft cover 100 is made from elastomer, so that the soft cover 100 can be easily folded in half or extended. The soft cover 100 may be forcibly folded in half or forcibly extended in an elongated plate shape by means of the user.

As shown in FIG. 4, when the body 200 has been slidably moved upwards with respect to the soft cover 100, the soft cover 100 is symmetrically aligned about the body 200. In this case, the user can conveniently use the portable communication apparatus when the user listens to the music or plays games because the user can manipulate keys with both hands while aligning the body 200 in a transverse direction.

As shown in FIG. 1, a sub-display unit 125 is provided at the other surface of the second section 112 of the soft cover 100. In addition, as shown in FIG. 2, a camera lens module including a camera lens 130 is provided at the other surface of the first section 110 of the soft cover 100. The camera lens module includes two lens openings 132 and 134. The camera lens 130 moves so as to be selectively positioned in the opening 132 or the opening 134.

Figure 5:
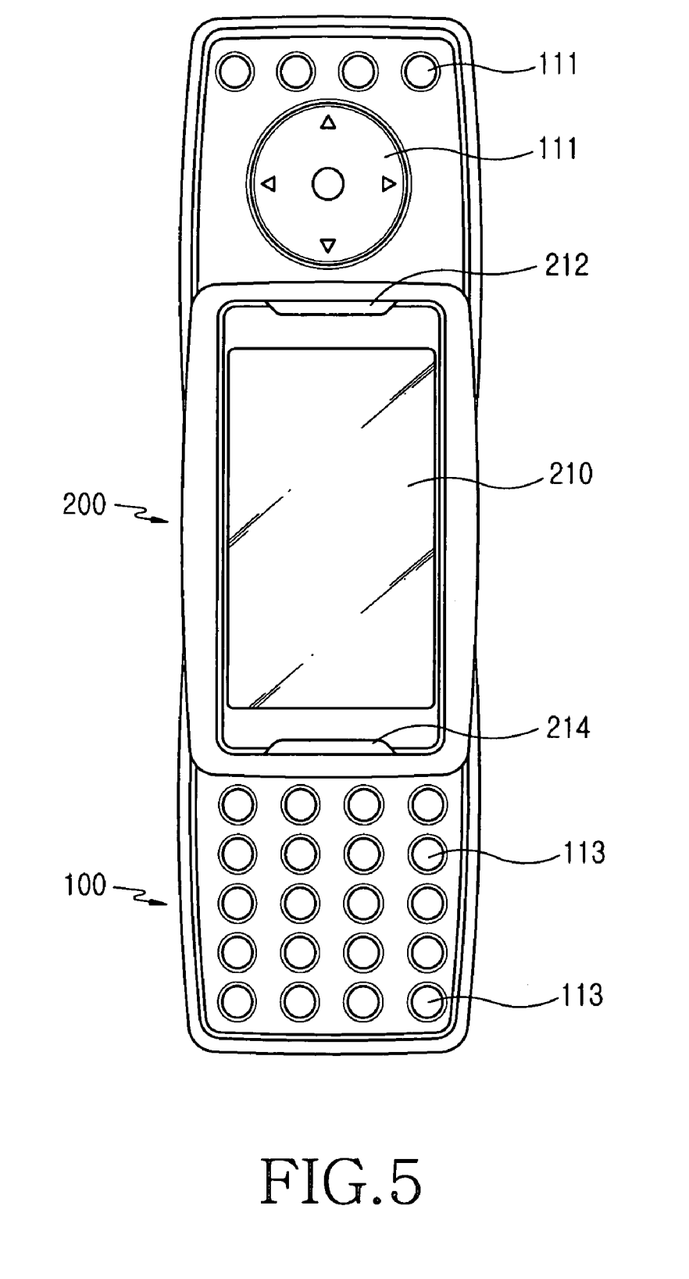
FIG. 5 is a front view of FIG. 4.

As shown in FIG. 5, when the body 200 has been slidably moved upwards with respect to the soft cover 100, the first and second key sections 111 and 113 are symmetrically aligned about the body 200. Thus, since the first and second key sections 111 and 113 are symmetrically aligned about the display unit 210 of the body 200, the user can easily manipulate keys when the user plays games using the portable communication apparatus. In addition, the first speaker 212 is aligned adjacent to an upper portion of the display unit 210 and the second speaker 214 is positioned adjacent to a lower portion of the display unit 210. Accordingly, the first and second speakers 212 and 214 may generate stereo sound. When the body 200 has been slidably moved upwards with respect to the soft cover 100 in a state that the soft cover 100 is completely extended, the first key section 111 is adjacent to the first speaker 212, the first and second speakers 212 and 214 are adjacent to the display unit 210, and the second speaker 214 is adjacent to the second key section 113.

Figure 6:
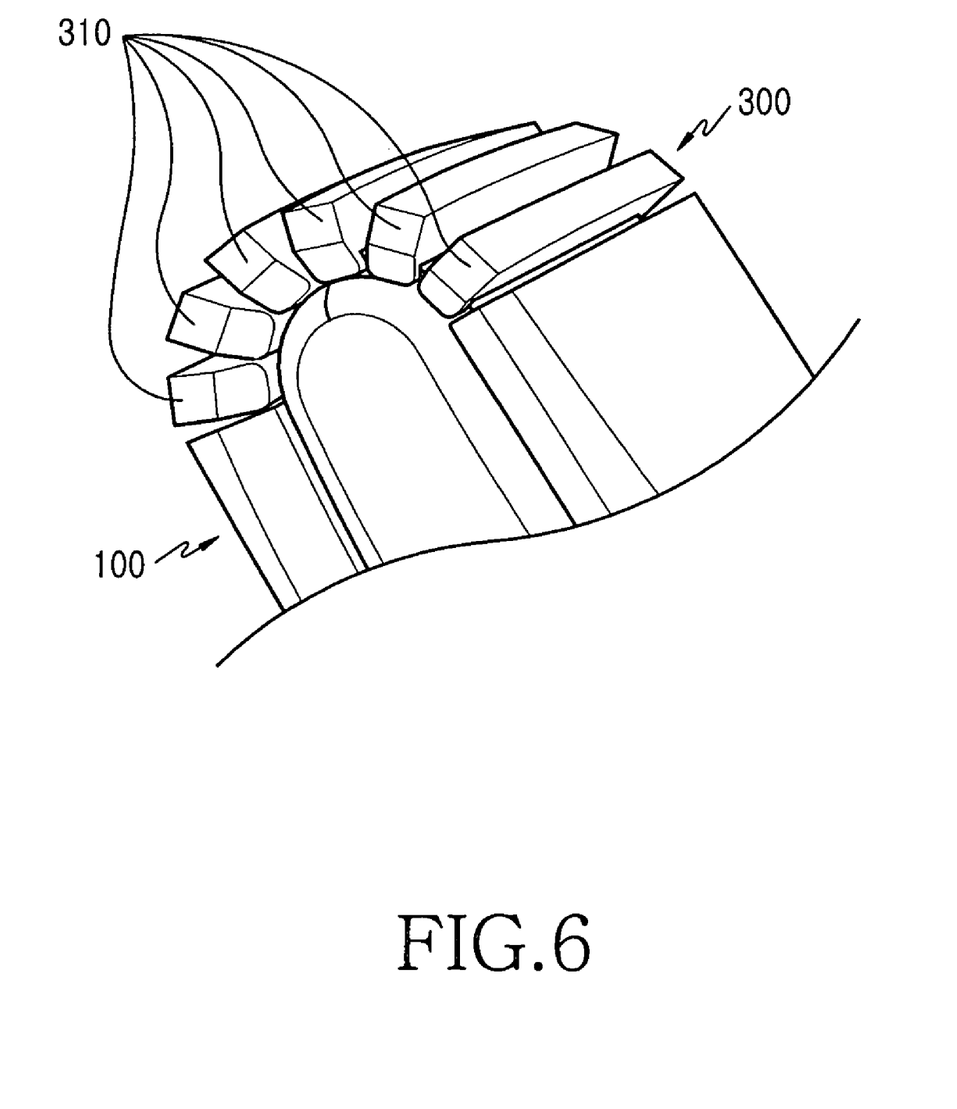
FIG. 6 is an enlarged perspective view of a hinge unit for a sliding-folding type portable communication apparatus according to one embodiment of the present invention when the sliding-folding type portable communication apparatus has been completely closed.
Figure 7:
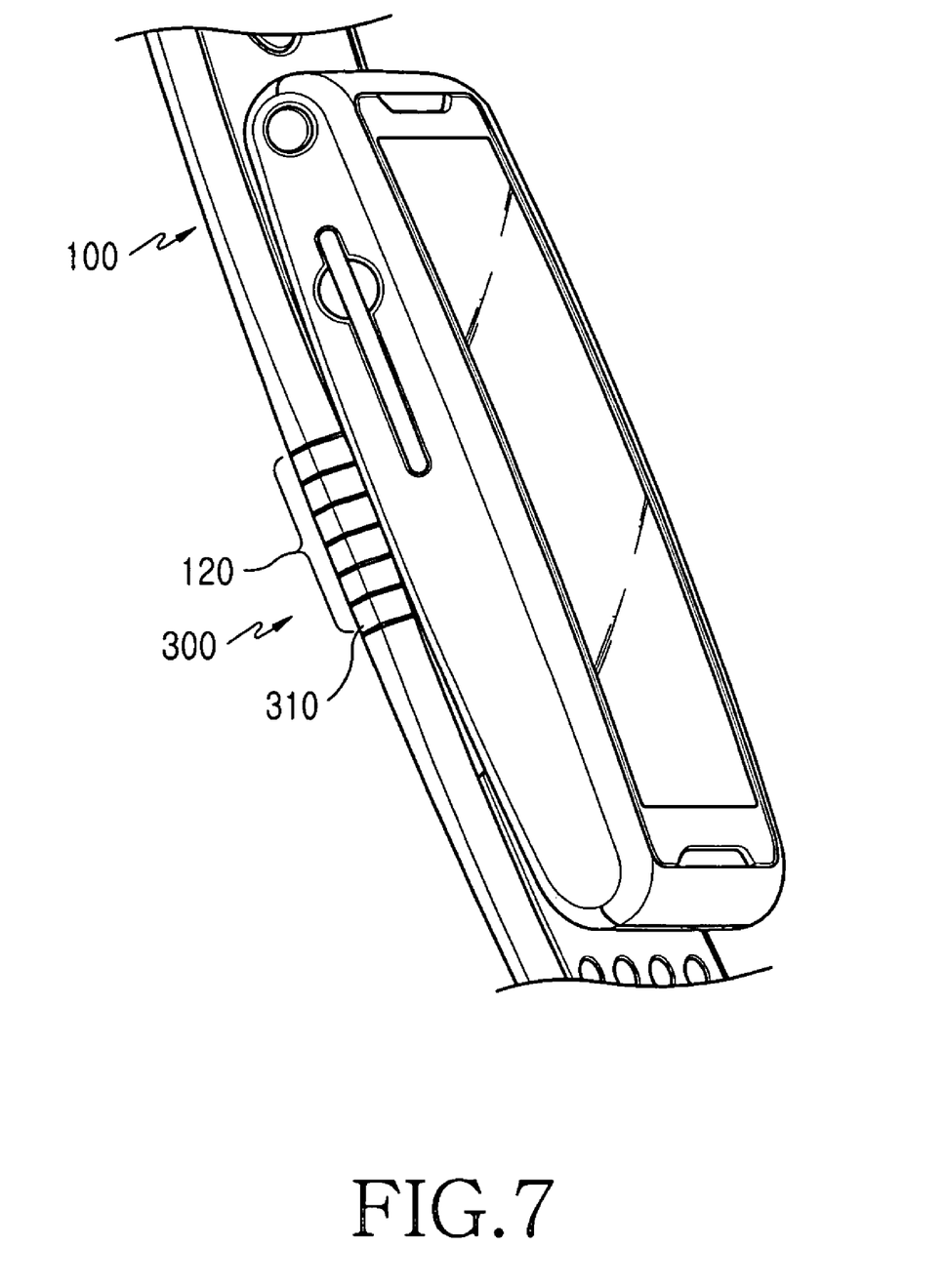
FIG. 7 is an enlarged perspective view of the hinge unit for a sliding-folding type portable communication apparatus according to one embodiment of the present invention when the sliding-folding type portable communication apparatus has been completely opened.

As shown in FIGS. 6 and 7, when the soft cover 100 is folded, the folding section 120, which is a part of the hinge unit 300, is corrugated in a manner similar to that of an articulated watch chain, as generally known in the art. The folding section 120 includes a plurality of hinge links 310 which are connected to each other such that the folding section 120 can be flexibly adapted for the folding or extending of the soft cover 100. In a folding state of the soft cover 100, as shown in FIG. 6, an interval between the hinge links 310 gradually increases further from a center portion of the hinge links 310. As shown in FIG. 7, in an extended state of the soft cover 100, the hinge links 310 are closely adjacent to each other. A bending angle of the hinge unit 300 does not exceed 180° due to the hinge links 310.

Figure 8A:
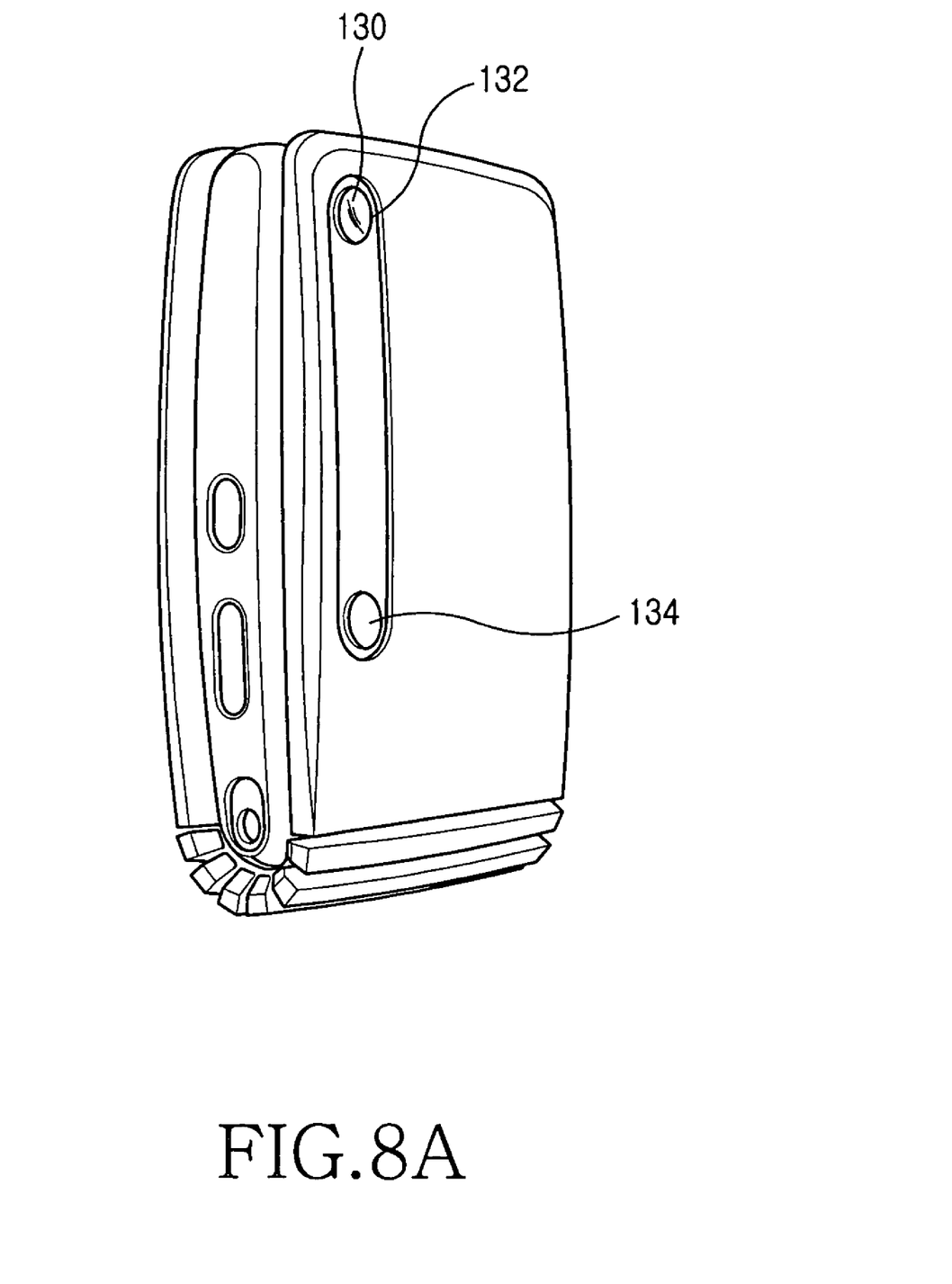
FIGS. 8A to 8C are perspective views illustrating operational states of camera lenses in relation to opening/closing states of a sliding-folding type portable communication apparatus according to one embodiment of the present invention.
Figure 8B:
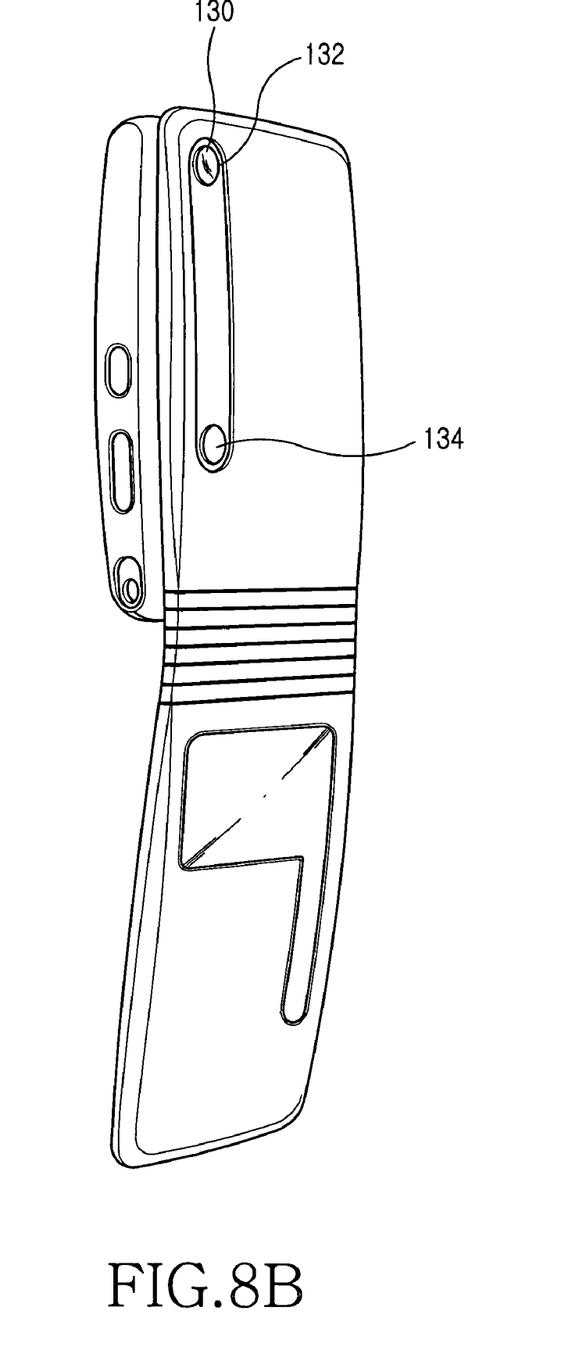
Figure 8C:
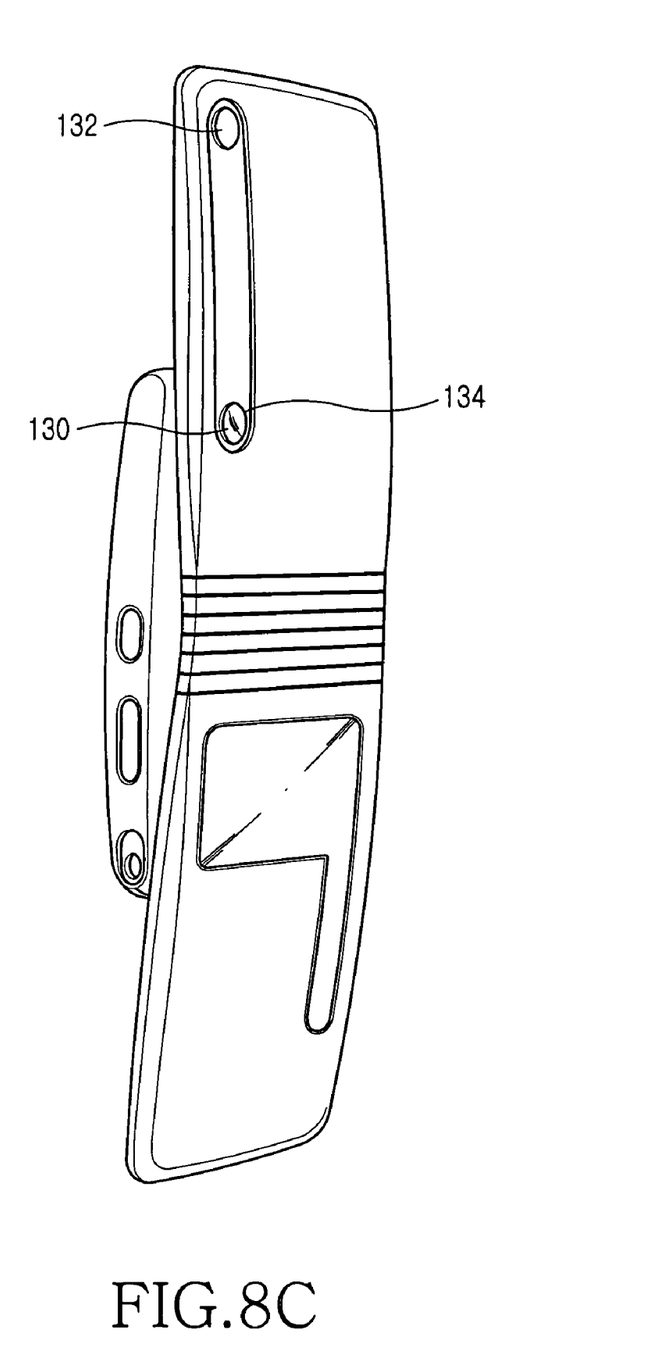

As shown in FIGS. 8A to 8C, the camera lens module is installed at the other surface of the first section 110 of the soft cover 100. The camera lens 130 of the cameral lens module is movably installed in the first section 110 of the soft cover 100. That is, the camera lens 130 can be selectively positioned in the opening 132 or the opening 134 of the camera module. Referring to FIGS. 8A and 8B, the camera lens 130 is positioned in the first opening 132, that is, a first position when the body 200 does not move with respect to the soft cover 100. Referring to FIG. 8C, the camera lens 130 is positioned in the second opening 134, that is, a second position when the body 200 has been slidably moved with respect to the soft cover 100. The camera lens 130 is integrally formed with the body 200 such that the camera lens 130 slidably moves together with the body 200 and is selectively positioned in the first position or the second position.

FIG. 3 shows a phone mode of the sliding-folding type portable communication apparatus according to the present invention, and FIGS. 4 and 5 show a camera-mode of the sliding-folding type portable communication apparatus according to the present invention. In a game mode or a music-listening mode, the sliding-folding type portable communication apparatus can be aligned as shown in FIGS. 4 and 5.

Although it is not illustrated in figures, a sliding module is provided between the soft cover and the body. The sliding module extends between a lower portion of the first key section and a lower portion of the body. In addition, the body can be fixedly coupled to the soft cover.

As described above, the present invention suggests a sliding-folding type portable communication apparatus which includes advantages of a sliding type portable communication apparatus and a folding type portable communication apparatus. In addition, according to the present invention, a body is slidably coupled to a soft cover folded in half, so the user can easily view images displayed in a display unit of the body while aligning the display unit in a transverse direction thereof. In addition, the user can easily manipulate the keys when playing games. Furthermore, since stereo sound is generated from two speakers, the user can listen to the music with high sound quality.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding-folding type portable communication apparatus for a user using the apparatus with both hands, comprising:
 a soft cover having a folding section, a first section, and a second section, the soft cover being folded to a U shape in a closed position and being extended in a first opened position and a second opened position, the first section having a first inner surface, the second section having a second inner surface, the first inner surface facing the second inner surface in the closed position;
 a hinge unit provided in the folding section;
 a body slidably coupled to the soft cover, the body being located between the first and second sections and inside the U shape at the closed position and sliding between the first and second opened positions while facing the first inner surface, the body including a display unit;
 a first key section including a plurality of first keys and provided on the first inner surface; and
 a second key section including a plurality of second keys and provided on the second inner surface,
 wherein the first and second key sections are opposite each other about the body when the body has been slid from the first opened position to the second opened position to facilitate the user manipulating the first and second key sections with both hands.

2. The sliding-folding type portable communication apparatus as claimed in claim 1, wherein the user manipulates the first and second key sections in a game mode.

3. The sliding-folding type portable communication apparatus as claimed in claim 1, wherein the folding section has a corrugated shape.

4. The sliding-folding type portable communication apparatus as claimed in claim 1, wherein the hinge unit is corrugated in a form of a watch chain and includes a plurality of hinge links connected to each other.

5. The sliding-folding type portable communication apparatus as claimed in claim 1, wherein the body is moveable along the soft cover when the soft cover is extended.

6. The sliding-folding type portable communication apparatus as claimed in claim 1, wherein the body includes first and second speakers, which are aligned at upper and lower portions of the display unit to generate stereo sound.

7. The sliding-folding type portable communication apparatus as claimed in claim 1, wherein the soft cover has formed at a rear surface thereof with at least one camera lens opening for exposing a camera lens to an exterior.

8. The sliding-folding type portable communication apparatus as claimed in claim 7, wherein the at least one camera lens opening includes a first opening formed at the closed position and the first opened position and a second opening formed at the second opened position.

9. The sliding-folding type portable communication apparatus as claimed in claim 8, wherein the camera lens is selectively positioned at the first opening or the second opening.

10. The sliding-folding type portable communication apparatus as claimed in claim 7, wherein the camera lens is slidably moved together with the body.

11. The sliding-folding type portable communication apparatus as claimed in claim 1, wherein both sides of the soft cover are symmetrically aligned about the body when the body has been slid along the soft cover when the soft cover is extended.

12. The sliding-folding type portable communication apparatus as claimed in claim 1, wherein the soft cover includes elastomer.

13. The sliding-folding type portable communication apparatus as claimed in claim 1, wherein one end of the body is surrounded by the hinge unit when the soft cover is completely folded.

14. The sliding-folding type portable communication apparatus as claimed in claim 1, wherein a sub-display unit is provided at a rear surface of the soft cover.

15. The sliding-folding type portable communication apparatus as claimed in claim 6, wherein, when the body has been slid along the soft cover when the soft cover is completely extended, the first key section is adjacent to the first speaker, the first and second speakers are adjacent to the display unit, and the second speaker is adjacent to the second key section.

16. The sliding-folding type portable communication apparatus as claimed in claim 1, wherein the soft cover has an elongated plate shape, which is folded in half or fully extended by means of the hinge unit.

* * * * *